Jan. 14, 1958 J. A. GREEFKES 2,820,199

PUSH-PULL MODULATOR

Filed May 25, 1955

INVENTOR

JOHANNES ANTON GREEFKES

BY Fred M. Vogel

AGENT

United States Patent Office 2,820,199

Patented Jan. 14, 1958

2,820,199

PUSH-PULL MODULATOR

Johannes Anton Greefkes, Eindhoven, Netherlands, assignor, by mesne assignments, to North American Philips Company, Inc., New York, N. Y., a corporation of Delaware Application May 25, 1955, Serial No. 510,977

3 Claims. (Cl. 332—31)

The invention relates to a circuit arrangement for the relative modulation of two signals. For this purpose, it has been suggested to supply one signal to the base electrode and the other signal to the emitter electrode of a junction transistor of the symmetrical type, the bias voltage sources being omitted, so that a modulated signal is produced across the collector circuit. The modulated signal then comprises components having the frequencies of the two signals to be modulated which can be compensated by push-pull connection both for one signal and for the other.

In the circuit arrangements then obtained, the transistors may all be of the same type; one signal $p$ is supplied through push-pull transformers to a first and to a second pair, respectively, of these transistors, whereas the other signal $q$ is fed in phase opposition to one pair and to the other pair, respectively, of these transistors, so that a modulated signal $p \pm q$ is produced which exhibits neither the frequency of the signal $p$, nor that of the signal $q$. Two pairs of transistors of relatively opposite conductivity types may be utilized; in this case it suffices to supply the signal $q$ in the same phase to the two pairs of transistors.

These circuits arrangements exhibit the property that with any phase of the signals $p$ and $q$ one of the transistors always operates as an amplifier. They have, however, a limitation in that at the same time in one of the other transistors collector-base rectification of the signal $q$ occurs, which results in an unwanted load for this signal $q$ and a reduction of the amplification of the modulated signal $p \pm q$. If, at a given instant the upper terminal of those to which the signal $p$ is supplied and the left-hand terminal of those to which the signal $q$ is fed are negative relative to the other terminals, the upper transistor may operate as an amplifier, but the lower transistor will exhibit unwanted collector-base rectification.

The invention has for its object to provide a push-pull modulator for the relative modulation of the two signals, comprising two transistors of the NPN type and two of the PNP type, united by connection of the P zone of the NPN transistors to one of the P zones of the NPN transistors and by connection of the N zone of the PNP transistors to one of the N zones of the NPN transistors to form two transistors of the four zone type.

In order that the invention may be better understood and readily carried into effect, it will now be described more fully with reference to the accompanying drawing, wherein.

Figure 1:
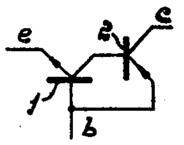
Fig. 1 is a schematic diagram of a known combination of an NPN and a PNP transistor.

In Fig. 1, the base electrode of the NPN transistor 1, connected to the P zone, is connected to one of the P zones of the PNP transistor 2, in this case via the emitter electrode and the base electrode of the PNP transistor 2, connected to the N zone is connected to one of the N zones of the transistor 1, i. e. via the collector electrode. The emitter electrode and the collector electrode of the transistors 1 and/or 2 may, if desired, be interchanged. The combination is identical with a four-zone transistor, in which the base electrode of one of the transistors, in this case the transistor 1, operates as the base electrode $b$ of the four-zone transistor, the associated free electrode of the transistor 1 operates as the emitter electrode $e$ and that of the other transistor 2 as the collector elecrode $c$ of the four-zone transistor.

The invention has the feature that one signal is supplied in push-pull to the two emitter electrodes of these four-zone transistors with such a high amplitude that the corresponding collector currents are substantially independent of this amplitude, whereas the other signal is fed to the two collector electrodes of the four-zone transistors with such a small amplitude that the corresponding collector currents vary substantially linearly with this amplitude.

Figure 2:
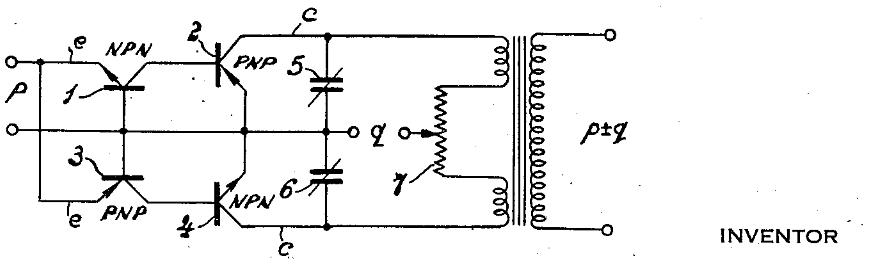
Fig. 2 is a schematic diagram of an embodiment of the circuit arrangement of the present invention.

The modulator shown in Fig. 2 comprises two transistors 1 and 4 of NPN type and two transistors 2 and 3 of PNP type; the transistors 1 and 2 and 3 and 4, respectively, are united in the manner shown in Fig. 1 to form two transistors of the four-zone type. The signal $p$ is fed in push-pull to the emitter electrodes $e$ of these four-zone transistors 1, 2 and 3, 4, respectively; thus, since these transistors 1, 2 and 3, 4 are of opposite conductivity type, a push-pull input transformer may be dispensed with. The signal $q$ is fed to the two collector electrodes $c$ of the four-zone transistors 1, 2 and 3, 4, respectively, either in push-pull, as is shown, or in the same phase, which, however, requires a complicated output transformer. An accurate push-pull adjustment may be obtained with the aid of capacitors 5 and 6 or the potentiometer 7. Bias voltage sources between the transistor electrodes may then be omitted.

Figure 3:
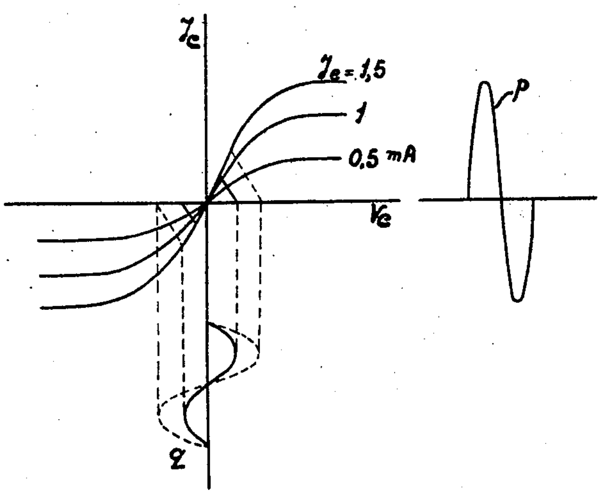
Fig. 3 is a graphical presentation of the collector current versus collector voltage characteristic curves of the embodiment of Fig. 2.

Fig. 3 illustrates the collector current $I_c$ of such a four-zone transistor 1, 2 as a function of the collector voltage $V_c$ of the signal $q$ for different values of the emitter current $I_e$ produced by the signal $p$. It is remarkable that both with positive and negative values of the voltage $V_c$ a current $I_c$, amplified relative to the current $I_e$, is produced. Therefore, the signal $p$ will produce an amplified modulation product $p \pm q$ in the modulator shown in Fig. 3.

It is usually desired that the modulation product should be substantially independent of the amplitude, namely of amplitude variations of one signal, and should vary substantially linearly with the amplitude of the other signal. For this purpose, the signal $p$ is fed to the transistors 1, 2 and 3, 4 with such a high amplitude that the corresponding collector current $I_c$ is substantially independent of this amplitude, whereas the signal $q$ remains limited to such a small amplitude that $I_c$ varies substantially linearly with this amplitude.

This is illustrated in Fig. 3. At a given value of the signal $q$ the current $I_c$ may be determined with the aid of the full load line. If the amplitude of signal $p$, i. e. the maximum value of $I_e$, increases, $I_c$ will thus hardly increase. However, if the signal $q$ varies from the value indicated by a full line to the value indicated in a broken line, it is found from the associated load line, indicated by a broken line, that $I_c$ and hence also the modulation product $p \pm q$ has increased substantially proportionally to $q$.

It is evident from the foregoing that, for example, the transistor 3 may be of NPN type and the transistor 4 of PNP type; in this case, however, a load input transformer is required for the signal *p*.

While the invention has been described by means of a specific example and in a specific embodiment, I do not wish to be limited thereto, for obvious modifications will occur to those skilled in the art without departing from the spirit and scope of the invention.

What is claimed is:

1. A circuit arrangement comprising a first and second pair of transistors each comprising a first junction transistor having an emitter electrode, a collector electrode and a base electrode, and a second junction transistor of opposite conductivity type from said first transistor having an emitter electrode, a collector electrode and a base electrode, means for directly connecting the base electrode of said first transistor to the emitter electrode of said second transistor and means for directly connecting the collector electrode of said first transistor to the base electrode of said second transistor, means for applying a first signal of relatively high amplitude to the emitter electrodes of the first transistors of said first and second pairs of transistors, and means for applying a second signal of relatively low amplitude to the collector electrodes of the second transistors of said first and second pairs of transistors thereby producing an output signal across said last-mentioned electrodes which varies substantially linerally with said last-mentioned amplitude.

2. A circuit arrangement comprising a first and second pair of transistors each comprising a junction transistor of PNP type having an emitter electrode, a collector electrode and a base electrode, and a junction transistor of NPN type having an emitter electrode, a collector electrode and a base electrode, means for directly connecting the base electrode of said NPN transistor to the emitter electrode of said PNP transistor and means for directly connecting the base electrode of said PNP transistor to the emitter electrode of said NPN transistor, means for applying a series of carrier oscillations of relatively high amplitude to the emitter electrode of the NPN transistor of said first pair of transistors and to the emitter electrode of the PNP transistor of said second pair of transistors, and means for applying a series of modulating signals of relatively low amplitude to the collector electrode of the PNP transistor of said first pair of transistors and to the collector electrode of the NPN transistor of said second pair of transistors thereby producing an output signal across said last-mentioned collector electrodes which varies substantially linearly with said last-mentioned amplitude.

3. A circuit arrangement comprising a plurality of junction transistors each having an emitter electrode, a collector electrode and a base electrode, means for directly connecting the collector electrode of a first of said transistors to the base electrode of a second of said transistors, means for directly connecting the base electrode of said first transistor to the emitter electrode of said second transistor, means for directly connecting the collector electrode of a third of said transistors to the base electrode of a fourth of said transistors, means for directly connecting the base electrode of said third transistor to the emitter electrode of said fourth transistor, means for commonly connecting the base electrodes of said first and third transistors, means for commonly connecting the emitter electrodes of said second and fourth transistors; said first and fourth transistors being of one conductivity type and said second and third transistors being of opposite conductivity type from said first and fourth transistors, means for applying a first signal of relatively high amplitude in common between the emitter electrodes and the base electrodes of said first and third transistors, means for applying a second signal of relatively low amplitude in common between the emitter electrodes and the collector electrodes of said second and fourth transistors, and means for deriving an output signal which varies substantially linearly with said last-mentioned amplitude from the collector electrodes of said second and fourth transistors.

References Cited in the file of this patent

UNITED STATES PATENTS

| | | |
|---|---|---|
| 2,644,925 | Koros | July 7, 1953 |
| 2,655,610 | Ebers | Oct. 13, 1953 |
| 2,666,819 | Raisbeck | Jan. 19, 1954 |

OTHER REFERENCES

Transistor Circuit Design, Raisbeck, Electronics, December 1951, page 131.

UNITED STATES PATENT OFFICE

CERTIFICATE OF CORRECTION

Patent No. 2,820,199 January 14, 1958

Johannes Anton Greefkes

It is hereby certified that error appears in the above numbered patent requiring correction and that the said Letters Patent should read as corrected below.

In the heading to the printed specification, between lines 7 and 8, insert -- Claims priority, application Netherlands June 9, 1954 --.

Signed and sealed this 15th day of July 1958.

(SEAL)

Attest:

KARL H. AXLINE

Attesting Officer

ROBERT C. WATSON

Commissioner of Patents